March 11, 1947.   F. HORTON   2,417,201
PROCESS OF ISOMERIZING SATURATED LOW BOILING FEED HYDROCARBONS
Filed May 12, 1943
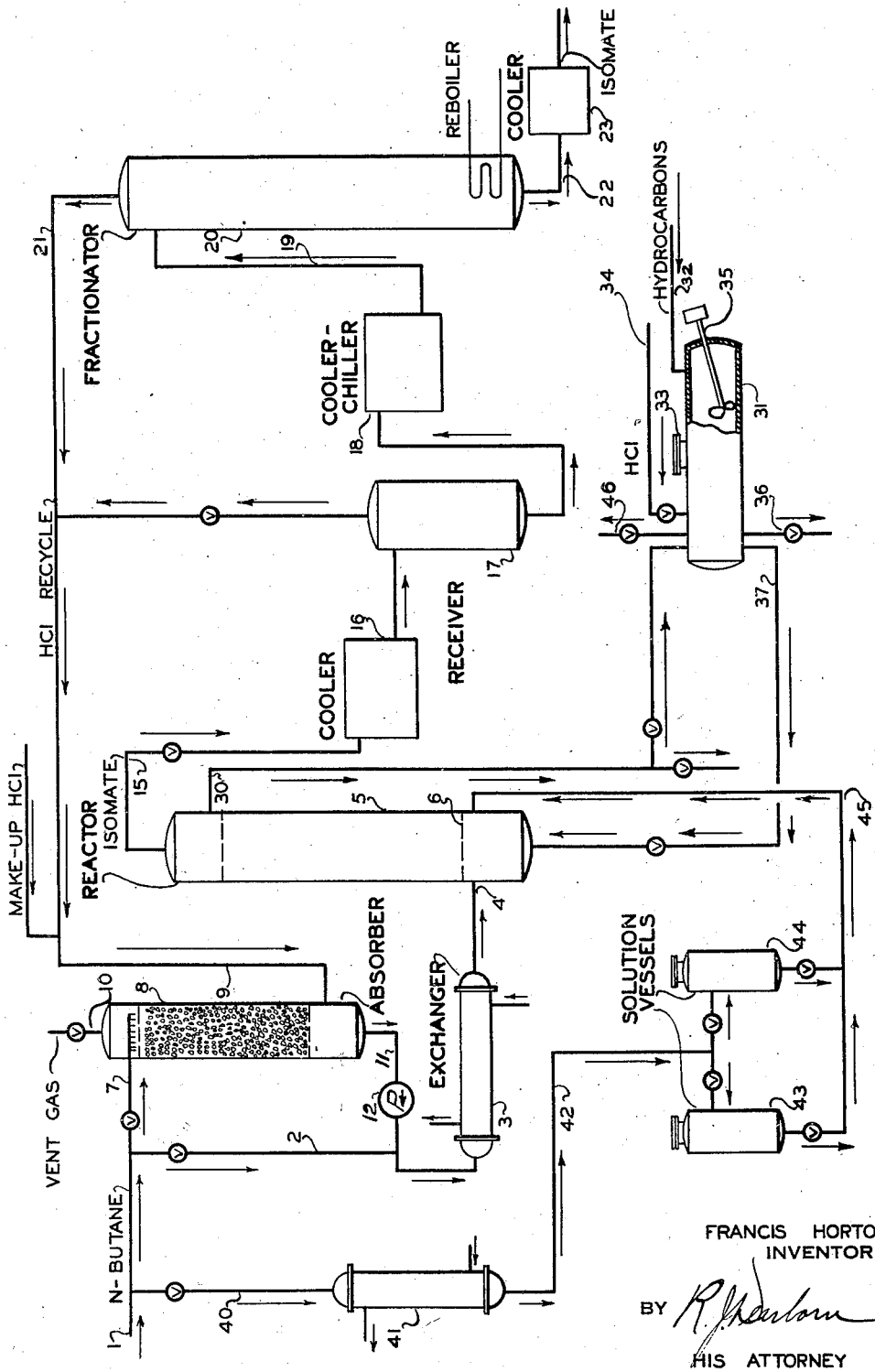
FRANCIS HORTON
INVENTOR
BY
HIS ATTORNEY Patented Mar. 11, 1947

2,417,201

UNITED STATES PATENT OFFICE 2,417,201

PROCESS OF ISOMERIZING SATURATED LOW BOILING FEED HYDROCARBONS

Francis Horton, New York, N. Y., assignor to The Texas Company, New York, N. Y., a corporation of Delaware Application May 12, 1943, Serial No. 486,685

4 Claims. (Cl. 260—683.5)

This invention relates to a continuous process for effecting catalytic conversions such as the isomerization of saturated hydrocarbons.

The invention has to do with the catalytic conversion of hydrocarbons by the action of a metallic halide conversion catalyst in the presence of a hydrogen halide promoter in a reaction zone maintained under reaction conditions and wherein there is a small amount of catalyst disappearance from the reaction zone during the course of the operation. In addition there is also a small amount of promoter withdrawn from the reaction zone in the effluent hydrocarbon stream. In accordance with the present invention a small amount of make-up metallic halide is dissolved in a stream of feed hydrocarbon passing to the reaction zone to compensate for the aforementioned catalyst disappearance while a small amount of promoter including recycled promoter is dissolved in a separate stream of feed hydrocarbon passing to the reaction zone.

The invention has particular application in effecting isomerization of feed hydrocarbons by contact with a liquid isomerization catalyst consisting essentially of metallic halide-hydrocarbon complex liquid maintained in the presence of hydrogen halide under isomerizing conditions in a reaction zone. A stream of treated hydrocarbons including isomerized hydrocarbons and containing hydrogen halide is continuously withdrawn from the reaction zone and subjected to fractionation so as to separate therefrom a gaseous fraction consisting mainly of hydrogen halide. This gaseous fraction is subjected to contact with a portion of the feed hydrocarbons so as to dissolve the hydrogen halide and the resulting solution is passed to the reaction zone. Make-up metallic halide dissolved in a separate portion of feed hydrocarbons and substantially free from hydrogen halide is separately passed to the reaction zone, the amount of make-up metallic halide added being adjusted to maintain the activity of the complex catalyst at a predetermined level.

Advantageously the metallic halide content of the complex catalyst within the reaction zone is maintained such that the effluent hydrocarbon stream is free from metallic halide as it leaves the reaction zone.

A feature of the process of this invention involves effecting the reaction by contact with a liquid catalyst of the metallic halide type such that the treated hydrocarbons leaving the reaction zone are free or substantially free from metallic halide, and separately injecting the make-up promoter and metallic halide to the reaction zone.

It has been found advantageous to effect a catalytic conversion, such as isomerization of normal butane by dispersing the feed hydrocarbon in a relatively stationary or quiescent column of the liquid complex catalyst. Maintaining the catalyst in a stationary or quiescent condition, that is, in the absence of mechanical agitation, is desirable from the standpoint of avoiding corrosion since the catalyst in the presence of a promoter exerts substantial corrosive action upon iron or steel whenever it is subjected to stirring or agitation. Corrosive action is particularly noticeable during the flow of the catalyst in the presence of promoter through conduits or passages of restricted cross-sectional area. Accordingly, the present invention is concerned with carrying out the process under conditions such that the catalyst is subjected to a minimum amount of movement, and such that make-up metallic halide and make-up or recycled promoter are incorporated in separate streams of feed hydrocarbon. Advantageously said streams are separately introduced to the catalyst body in the reactor.

In order to describe the process of this invention reference will now be made to the accompanying drawing illustrating the method of flow contemplated for isomerizing a saturated paraffin hydrocarbon such as normal butane.

As shown in the drawing normal butane or a saturated feed hydrocarbon mixture consisting essentially of normal butane is conducted from a source not shown through a pipe 1 and passed through a branch pipe 2 communicating with an exchanger 3 wherein the butane is heated to a temperature of about 200 to 210° F. and under a pressure of approximately 300 to 600 pounds per square inch gauge or sufficient to maintain the mixture leaving the reactor in the liquid phase. The heated butane leaves the exchanger through a pipe 4 which communicates with the lower portion of a reactor 5.

The reactor 5 advantageously comprises a tower filled to a substantial depth with a column of aluminum chloride-hydrocarbon complex liquid. This complex liquid may be a preformed complex derived from some other source or may comprise complex formed in situ during the course of the reaction.

A complex catalyst effective for isomerizing normal butane is characterized by having an apparent heat of hydrolysis in the range about 300 to 330 calories per gram of complex, equivalent to an absolute heat of hydrolysis of about 320 to 352 calories per gram of complex when corrected to include the heat absorbed by the calorimeter employed in the heat of hydrolysis test. Such a complex is free from solids which would be separated by centrifuging at about 3000 R. P. M. for a period of ½ hour in an A. P. I. centrifuge at about normal room temperature. It is thus substantially free from undissolved solid aluminum chloride. Normal butane isomerization in the presence of an aluminum chloride-hydrocarbon complex catalyst having a controlled heat of hydrolysis within the above-mentioned range to avoid catalyst carryover in solution in the effluent isomate stream is disclosed and claimed in the copending application of William R. Smith, Serial No. 448,728, filed June 27, 1942.

The complex liquid may be maintained within the reactor 5 to a depth of about 10 to 40 feet, provision being made for a separating space of 5 to 15 feet in the top of the reactor. Thus from 2 to 200 volumes of liquid catalyst per volume of hydrocarbon undergoing treatment may be maintained within the tower.

A distribution plate 6 is advantageously provided in the lower portion of the reactor 5 to facilitate distribution of the entering feed hydrocarbons in droplet form as the feed hydrocarbons rise through the relatively stationary column of complex liquid. Other means for effecting proper distribution may be used. Advantageously the drop diameter is maintained within the range about 1/64 to 1/4 inch.

The hydrocarbon droplets rise through the complex liquid by difference in density at a velocity which may range from 0.1 to 2 or 3 feet or more per second. It is desirable to control the velocity of flow so as to avoid substantial coalescence of the droplets as they rise through the liquid catalyst. Also it is desirable that the time of contact between hydrocarbon and catalyst be not in excess of about 1 to 5 or 10 minutes.

The rate of charging feed hydrocarbons, and the depth of catalyst may be adjusted to give the desired time of contact under which isomerization to the desired extent is obtained without the occurrence of cracking or other undesired side reactions, at least to any appreciable extent. For example, the charge rate may be within the range 50 to 2000 gallons of normal butane per square foot of horizontal cross-sectional catalyst body area per hour, the butane being measured as liquid at 60° F.

A separate portion of the feed hydrocarbon in the liquid phase and at approximately atmospheric temperature, for example in the range 70 to 100° F., is passed through a branch pipe 7 to the upper portion of an absorption tower 8. The absorption tower is packed with Raschig rings or other suitable packing material and the liquid butane flows downwardly through the packing material countercurrently to a rising stream of gas rich in hydrogen chloride which is introduced to the bottom of the tower through a pipe 9 from a source to which reference will be made later.

As will be explained later the hydrogen chloride gas may include fixed gases such as hydrogen and methane. These fixed gases are discharged as vent gas from the top of the absorption tower through a pipe 10.

The resulting solution of hydrogen chloride in normal butane is drawn off from the bottom of the absorption tower 8 through a pipe 11 and forced by a pump 12 through the previously mentioned exchanger 3, wherein it commingles with the butane feed entering from pipe 2 and in this way is likewise raised to the desired temperature prior to introduction to the reactor 5.

In the reactor, heat liberated in the isomerization reaction will raise the temperature of the butane-hydrogen chloride mixture by about 30 to 50° F.

Referring again to the reactor 5 the treated hydrocarbons comprising normal and isobutane accumulate in the top of the reactor above the surface of the complex liquid. These hydrocarbons are continuously withdrawn under a pressure of about 250 to 550 pounds while still in the liquid phase through a pipe 15 leading to a cooler 16 wherein the isomate mixture containing hydrogen chloride but free from aluminum halide is cooled to a temperature of approximately 100 to 200° F.

The resulting cooled mixture is drawn off to a receiver 17 maintained under a pressure of approximately 250 to 400 pounds.

From the receiver 17 the crude isomate is passed through a cooler and may be passed through a chiller unit 18, wherein it is reduced to a temperature of about 100° F. if the cooler alone is used, or to a temperature of about 40° F. if the chiller is also used.

From the unit 18 the cooled or chilled isomate is passed through a pipe 19 to the upper portion of a fractionator 20.

The fractionator 20 is maintained under conditions of temperature and pressure so as to strip from the isomate a gaseous fraction consisting mainly of hydrogen chloride but containing small amounts of fixed gases as previously mentioned. Thus, the bottom of the fractionator 20 may be maintained at a temperature of about 212° F. and at a pressure of about 260 pounds.

The gaseous fraction removed from the top of the fractionator 20 is conducted through a pipe 21 which communicates with the previously mentioned pipe 9.

The stripped isomate is continuously drawn off through a pipe 22 and through a cooler 23 from which it may be discharged to a receiving drum for further treatment. For example, it may be subjected to further fractionation for the purpose of separating the isoparaffin from the unreacted normal paraffin so that the normal paraffin can be recycled through the process.

A small amount of used catalyst is continuously or intermittently drawn off from the upper portion of the reactor 5 through a pipe 30 and may be discharged from the system. On the other hand all or a part of the withdrawn catalyst may be accumulated in a vessel 31. Thus, the vessel 31 advantageously serves as a storage vessel for the catalyst during shut-down periods when it may be desired to empty the reactor.

The vessel 31 may also be employed for preparing the preformed complex with which to charge the reactor at the outset.

This preformed complex may be prepared by reacting aluminum chloride with kerosene or kerosene hydrocarbons which are substantially free from aromatic and olefin constituents.

The reaction between aluminum chloride and kerosene or other aliphatic hydrocarbons is effected in the presence of hydrogen chloride at a temperature of about 210° F. so as to obtain a liquid complex having the characteristics already described. The kerosene or other aliphatic hydrocarbon may be conducted from a source not shown through a pipe 32 to the vessel 31. Similarly aluminum chloride and hydrogen chloride may be introduced through opening 33 and pipe 34 respectively. The reactant materials are subjected to agitation by means of a stirrer 35 and the mixture may be heated by means of a steam jacket surrounding the vessel 31 which jacket is not shown in the drawing.

Unreacted hydrocarbons are discharged from the vessel 31, as, for example, through the pipes 36 or 46 and the remaining complex is then conducted to the reactor through a pipe 37. Advantageously the complex liquid is displaced through the pipe 37 by forcing liquid butane into the vessel 31 under sufficient pressure to displace the complex from the vessel 31 through the pipe 37 into the reaction tower 5.

Advantageously the complex liquid is saturated with hydrogen chloride prior to displacement from the vessel 31. It is desirable to saturate it with hydrogen chloride under the pressure and temperature conditions prevailing within the reactor 5 so that the catalyst will exert optimum activity from the commencement of operations.

During continued operation, and unless make-up aluminum halide is added, the complex catalyst will decline in activity due to disappearance of aluminum halide from the reactor either as result of loss or consumption during the course of the operation as evidenced by a decline in the heat of hydrolysis of the complex within the reaction zone.

Accordingly, provision is made for the continuous or intermittent addition of aluminum chloride to the reaction zone. This is accomplished by diverting a portion of the feed butane through a pipe 40 leading to an exchanger 41 wherein it is heated to a temperature of about 160 to 210° F. or to approximately the reaction temperature. The heated stream is then passed through a pipe 42 to either one of two solution vessels 43 and 44 containing solid aluminum chloride. During passage through the vessels and in contact with the solid aluminum chloride a small amount is dissolved in the feed hydrocarbon stream. The stream containing dissolved aluminum chloride is conducted through a pipe 45 to the lower portion of the reactor 5.

As indicated it is advantageous to inject the solution of aluminum chloride in butane directly to the complex catalyst within the reactor prior to contact with promoter. It is desired to effect the solution of aluminum chloride in the feed hydrocarbon in the absence of any promoter. By doing so complex formation within the solution vessels and connecting pipes is avoided or substantially avoided. Likewise corrosive action which would otherwise be experienced in the vessels 43 and 44 and the pipe 45 is avoided.

The amount of butane feed diverted through the vessels 43 or 44 and the temperature of solution in these vessels is regulated so that the amount of aluminum chloride being injected into the reactor 5 is sufficient to maintain a complex liquid within the reactor characterized by having a heat of hydrolysis within the range set forth above. Likewise the amount of used complex drawn off and discharged through the pipe 30 is regulated so as to maintain a constant depth of catalyst liquid within the reaction tower 5.

Apparently a small amount of the feed butane enters into reaction with the aluminum chloride within the reactor 5 to form active complex material or to otherwise fortify the complex liquid therein.

While mention has been made of maintaining a complex catalyst within a heat of hydrolysis range as specified above, it is contemplated that this may be varied somewhat depending upon the specific conditions of operation employed as well as upon the feed hydrocarbon undergoing treatment. It is desired however, to maintain the complex of such character that substantial conversion to the desired isomer is secured without migration of aluminum chloride from the reactor in the effluent stream of isomerized hydrocarbons. Avoidance of migration can be assured by restricting aluminum halide addition so as to maintain complex which is slightly less than saturated with aluminum halide.

The amount of promoter employed in the reactor will also vary depending upon the conditions of temperature employed and the particular hydrocarbon undergoing treatment. When isomerizing normal butane at a temperature of about 210° F. so as to obtain 50 to 60% conversion to isobutane, basis normal butane feed, the promoter may range from a fraction of a per cent to 5% by weight of the feed undergoing treatment.

The reaction temperatures prevailing for normal butane isomerization may range from about 160 to 240° F. but a temperature of about 200 to 220 or 230° F. is preferred. Under these conditions a high conversion to isobutane is realized without experiencing any substantial amount of cracking as evidenced by the absence or substantial absence of lower or higher molecular weight hydrocarbons from the isomate.

The process is applicable to the treatment of other hydrocarbons besides normal butane, as, for example, isomerization of pentane, hexane, etc., or mixtures of naphtha hydrocarbons or fractions of naphtha.

Mention has been made in describing the drawing of specific pressure conditions prevailing at different stages in the process. However, these conditions may be varied substantially from those mentioned.

Mention has been made of aluminum chloride in preparing the complex catalyst and it is contemplated that other metallic halides including aluminum bromide may be employed. Likewise the promoter may comprise other hydrogen halides besides hydrogen chloride. If desired the reaction may be carried out in the presence of hydrogen or other agents adapted to modify the reaction.

The process described is applicable to operations wherein a solid metallic halide catalyst is employed in the reaction zone, or a mixture of solid and liquid catalysts, and wherein it is necessary to add a small amount of make-up metallic halide to compensate for disappearance from the reaction zone.

It is also applicable to other than isomerization processes, as for example, condensation reactions such as the alkylation of low boiling olefins and isoparaffins in the presence of a metallic halide type of catalyst to thereby produce saturated hydrocarbons of highly branched chain character.

Obviously many modifications and variations of the invention, as hereinbefore set forth, may be made without departing from the spirit and scope thereof, and therefore only such limitations should be imposed as are indicated in the appended claims.

I claim:

1. A continuous process of isomerizing saturated low boiling feed hydrocarbons which comprises maintaining within a reaction zone a substantially static column of metallic halide-hydrocarbon complex liquid isomerization catalyst, passing said feed hydrocarbons in liquid phase upwardly through said column in the presence of hydrogen halide under conditions such that isomerization constitutes the principal reaction, continuously withdrawing from the upper portion of the reaction zone at a point above the column of said catalyst an effluent liquid stream comprising hydrocarbons including isomerized hydrocarbons and hydrogen halide substantially free from metallic halide, subjecting said effluent stream to fractionation to strip therefrom a gaseous fraction consisting mainly of hydrogen halide and a small amount of fixed hydrocarbon gas comprising methane, passing said gaseous fraction through a scrubbing zone, subjecting it therein to countercurrent contact with a stream of feed hydrocarbon in liquid phase and having at least 4 carbon atoms per molecule such that hydrogen halide is dissolved in said stream and fixed gas remains undissolved, discharging said undissolved fixed gas, injecting said stream to the lower portion of said column of catalyst, subjecting a separate liquid stream of feed hydrocarbon comprising normal butane to contact with solid metallic halide in the absence of added hydrogen halide under conditions such that a small amount of metallic halide is dissolved therein, separately injecting said stream containing dissolved metallic halide into the lower portion of said column at a point removed from that at which the hydrogen halide bearing stream is injected, withdrawing used complex from the upper portion of said column and regulating the amount of metallic halide injected so as to maintain said complex catalyst within the reaction zone at a predetermined level of activity and substantially free from solid metallic halide.

2. A continuous process of isomerizing normal butane which comprises maintaining within a reaction zone a substantially static column of aluminum halide-hydrocarbon complex liquid isomerization catalyst, passing said normal butane in liquid phase upwardly through said column in the presence of hydrogen halide under conditions such that isomerization constitutes the principal reaction, continuously withdrawing from the upper portion of the reaction zone at a point above the column of said catalyst an effluent liquid stream comprising normal and iso butane including hydrogen halide and fixed hydrocarbon gas comprising methane substantially free from aluminum halide, subjecting said effluent stream to fractionation to strip therefrom a gaseous fraction consisting mainly of hydrogen halide and containing fixed gas, passing said gaseous fraction through a scrubbing zone, subjecting it therein to countercurrent contact with a stream of normal butane such that hydrogen halide is dissolved in said stream and fixed gas remains undissolved, discharging said undissolved fixed gas, injecting said stream to the lower portion of said column of catalyst, subjecting a separate stream of normal butane to contact with solid aluminum halide in the absence of added hydrogen halide under conditions such that a small amount of aluminum halide is dissolved therein, separately injecting said stream containing dissolved aluminum halide into the lower portion of said column at a point removed from that at which the hydrogen halide bearing stream is injected, withdrawing used complex from the upper portion of said column and regulating the amount of aluminum halide injected so as to maintain said complex catalyst within the reaction zone at a predetermined level of activity and substantially free from solid aluminum halide.

3. In the continuous catalytic isomerization of saturated feed hydrocarbons comprising normal butane, wherein the feed hydrocarbons are passed upwardly in liquid phase through a substantially static column of aluminum halide-hydrocarbon complex liquid catalyst maintained within a reaction zone under isomerizing conditions including an elevated temperature below about 240° F. and in the presence of a hydrogen halide promoter, an effluent isomate liquid stream substantially free from aluminum halide is withdrawn from the upper portion of the reaction zone, and the isomate stream is subjected to fractionation to separate a normally gaseous fraction including the hydrogen halide promoter, the improvement which comprises dividing the said liquid saturated feed hydrocarbons in three parts, preheating one part of said feed hydrocarbon stream to a temperature within the range of about 160° F. up to the said elevated conversion temperature maintained in said reaction zone while maintaining the feed hydrocarbons in liquid phase, passing said preheated part in contact with solid aluminum halide and in the absence of said promoter to dissolve a controlled amount of the aluminum halide in said heater liquid stream, passing a second part of said liquid hydrocarbon feed at a temperature below about 100° F. in contact with said normally gaseous fraction and any makeup hydrogen halide to recover hydrogen halide in solution in said second liquid stream, admixing the third part of said liquid hydrocarbon feed with said second part containing the dissolved hydrogen halide, then preheating said mixed second and third parts in the absence of said first part to an elevated temperature while maintaining the hydrogen halide in solution therein, introducing a stream of said preheated mixed second and third parts into a lower portion of said reaction zone, and separately introducing a stream of said preheated first part containing dissolved aluminum halide into a lower portion of said reaction zone at a point removed from that at which the stream of mixed second and third parts containing dissolved hydrogen halide is introduced.

4. In the continuous catalytic isomerization of n-butane, wherein the n-butane feed is passed in dispersed liquid droplets upwardly through a reaction zone containing a static column of liquid $AlCl_3$-hydrocarbon complex in the presence of HCl promoter at an elevated conversion temperature, a stream of the resulting isomate accumulating above the liquid catalyst column is continuously withdrawn and fractionated to separate a normally gaseous fraction containing HCl from residual isomate consisting essentially of isobutane and unconverted n-butane, the improvement which comprises dividing the normal butane feed into three parts, namely: (1) a stream which is preheated to about 160° F. to 240° F. and then passed in the absence of HCl into a solution zone in contact with solid $AlCl_3$ to dissolve a controlled portion of $AlCl_3$ in the preheated stream, (2) an unheated stream which is passed in the absence of $AlCl_3$ into an absorption zone in contact with said normally gaseous fraction and any makeup HCl at a temperature below 100° F. to dissolve HCl and separate the same from said normal gaseous fraction, and (3) a stream which by-passes both said solution and absorption zones but which is preheated and thus serves as a heat absorbing medium and in admixture with stream (2) above prevents objectionable gasification of dissolved HCl, simultaneously introducing said streams into a lower portion of said reaction zone, and regulating the proportions of said streams and the preheating so that said streams maintain the said conversion temperature of about 160 to 240° F. within the reaction zone, an effective HCl concentration therein varying from a fraction of a per cent to about 5% by weight based on the hydrocarbon feed, and the activity of the static column of liquid catalyst at a predetermined level providing substantial conversion of n-butane to isobutane in once-through flow through the reaction zone.

FRANCIS HORTON.

REFERENCES CITED

The following references are of record in the file of this patent:

UNITED STATES PATENTS

| Number | Name | Date |
|---|---|---|
| 2,222,012 | Amos et al. | Nov. 19, 1940 |
| 2,266,012 | D'Ouville et al. | Dec. 16, 1941 |
| 2,300,235 | Pines et al. | Oct. 27, 1942 |
| 2,301,615 | Chenicek et al. | Nov. 10, 1942 |
| 2,308,560 | Carmody et al. | Jan. 19, 1943 |
| 2,314,297 | Watson | Mar. 16, 1943 |
| 2,317,241 | Ackerman et al. | Apr. 20, 1943 |
| 2,331,429 | Sensel et al. | Oct. 12, 1943 |
| 2,342,922 | Danforth I | Feb. 29, 1944 |
| 2,343,406 | Dryer | Mar. 7, 1944 |
| 2,349,821 | Fragen | May 30, 1944 |
| 2,354,851 | Danforth II | Aug. 1, 1944 |
| 2,366,117 | Leonard | Dec. 26, 1944 |
| 2,378,685 | Carney | June 19, 1945 |
| 2,379,550 | Sutton | July 3, 1945 |

FOREIGN PATENTS

| Number | Country | Date |
|---|---|---|
| 377,663 | Italian | Jan. 2, 1940 |

OTHER REFERENCES

Ottenweller et al., Ind. and Eng. Chem. 35 207–9 (1943).